June 7, 1938. H. F. MAYNES Re. 20,751

FISHING REEL

Original Filed Dec. 9, 1935

INVENTOR
Hyla F. Maynes,
BY
Bean, Brooks, Buckley & Bean.
ATTORNEYS

Reissued June 7, 1938

Re. 20,751

UNITED STATES PATENT OFFICE 20,751

FISHING REEL

Hyla F. Maynes, North Tonawanda, N. Y., assignor of one-half to Emma C. Maynes, North Tonawanda, N. Y.

Original No. 2,040,777, dated May 12, 1936, Serial No. 53,635, December 9, 1935. Application for reissue September 16, 1937, Serial No. 164,246

13 Claims. (Cl. 242—84.4)

This invention relates to a fishing reel and it has particular relation to mechanism for driving elements of level wind devices to insure proper reversal of a fishing line in its travel from end to end on a spool upon which it is wound.

One object of the invention is to provide an improved mounting for gears, pinions and spool shafts in a reel construction.

Another object of the invention is to provide an improved arrangement at certain locations to prevent delay in reversal of a fishing line in its lateral movement from end to end of the line winding spool.

Another object of the invention is to provide an improved assembly and operating mechanism for reel spools and level wind members of a fishing reel.

The invention involves improvements in the type of fishing reel disclosed in my co-pending application Serial No. 25,275, June 6, 1935, matured into Patent No. 2,027,306, granted January 7, 1936.

Figure 1:
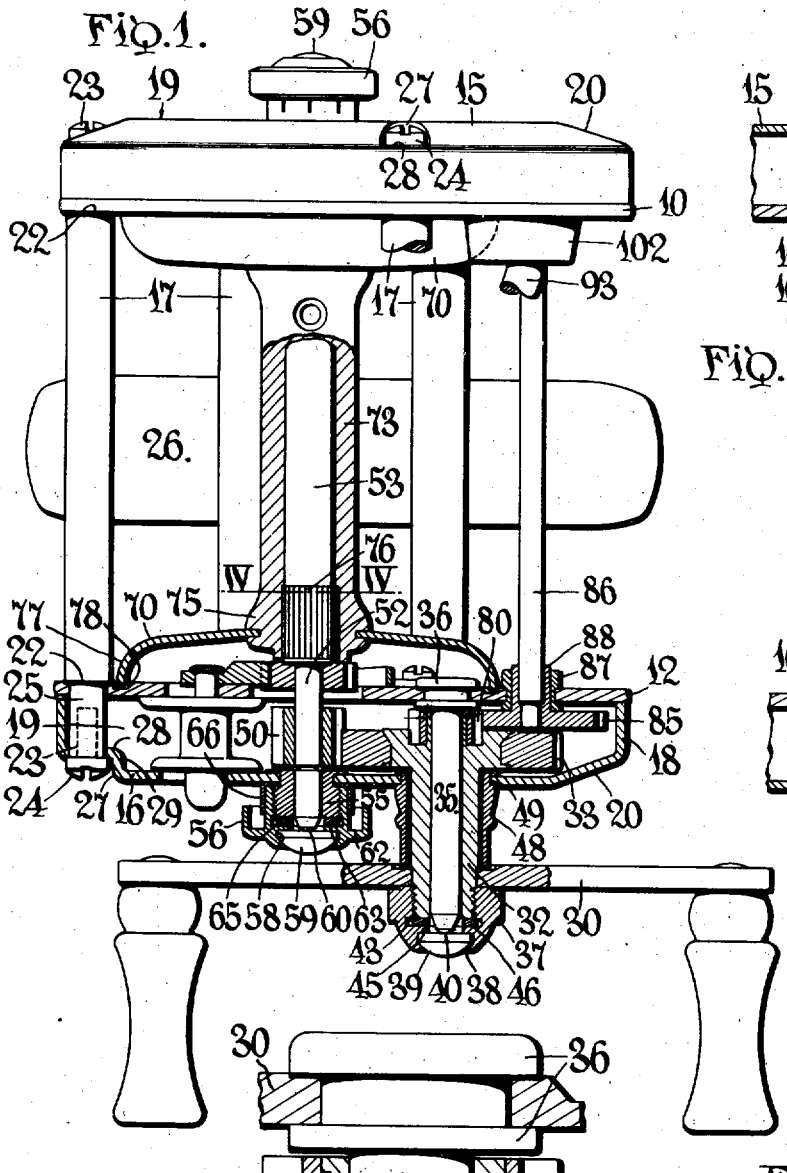
Fig. 1 is a view of a reel wherein a plan of certain portions of the reel is illustrated and other portions thereof are broken away to illustrate structural elements in horizontal section.

In practicing the invention a pair of parallel disc-like heads or end plates 10 and 12 are assembled with cup shaped end casings 15 and 16, respectively, by means of spacing bars 17 disposed through both the plates and casings adjacent their marginal portions. Inwardly turned flanges 18 of the casings abut the plates 10 and 12 adjacent their marginal edges to provide closed chambers or housings 19, and the casings are provided with annular beveled wall sections or zones 20 adjacent their outer extremities. These elements 10—15 and 12—16 thus constitute end frame members cooperating with the bars 17 to complete the main body structure of the reel.

End portions of the spacing bars are reduced in diameter to provide shoulders or abutments 22 for positioning the plates 10 and 12 in spaced parallel relation. Suitable fastening elements 23, such as screws, and having heads 24 are threaded axially into reduced end portions 25 of the bars 17 to secure the end plates, casings and bars in rigidly assembled relation. The beveled sections or zones 20 are provided with recesses 27 defined by flat wall portions 28 parallel to the end plates 10 and 12 and by shoulders 29. The fastener heads 24 abut the wall portions 28 in securing the elements together. Since these heads do not extend outwardly beyond the outer plane of the end casings, they blend with the beveled configuration of these casings in partially obscured relation in the recesses 27 and are protected by the surrounding shoulders 29 defining the recesses.

A pair of adjacent bars 17 are rigidly secured to a saddle 26 adapted to be mounted upon the fishing rod (not shown) for the purpose of supporting the reel in a conventional manner suitable for its normal operation.

A double crank 30 is non-rotatably secured upon the outer end portion of a sleeve 32 that is formed rigidly as an axial extension of a driving gear 33 and, together with this gear, is rotatably mounted upon a bearing stud 35. A head 36 formed integrally upon the inner end of the stud is rigidly carried in the end plate 12, and a nut or screw threaded cap 37 secured upon the outer end of the sleeve 32 maintains the crank and sleeve 32 in their proper relative positions.

A socket 38 formed in the outer end portion of the cap 37 firmly embraces a jewel bearing element 39 which impinges against a cooperating jewel bearing element 40 provided upon the outer end of the stud 35. Another socket 43 separated from the socket 38 by a flange 45 carries a flexible washer 46 composed of material, such as fibre or felt, which is confined between the socket flange 45 and the end of the sleeve 32. A cylindrical casing 48 loosely surrounds the bearing sleeve 32 and is rigidly mounted, as indicated at 49, coaxially with such sleeve in the outer wall of the casing 16. The portion of the crank 30 adjacent the junction thereof with the sleeve 32 does not abut the outer end of the casing 48.

A relatively small gear 50 is rigidly secured upon a reduced end portion 52 of a spool shaft 53 that has each end portion rotatably carried in a bearing support 55 mounted rigidly in the wall of each of the end casings. Each bearing support 55 is provided with a cap 56 threaded thereon and is formed with a socket 58 in its outer end portion firmly embracing a jewel thrust bearing element 59 which impinges against a cooperating jewel bearing element 60 mounted upon the end of the reduced spool shaft portion 52. An inner socket 62 separated from the socket 58 by a flange 63 carries a flexible washer 65 composed of material, such as fibre or felt, which is confined between the socket flange 63 and the bearing support 55. A shell or cup 66 fits about the inner end of the cap 56 and the inner portion is confined between the outer wall of the casing 16 and the inner end of the cap 56.

A pair of cupped discs 70 are secured coaxially upon a central spool sleeve 73 of the spool shaft 53 by means of end portions 75 of the sleeve which are spun outwardly about an intermediate wall portion of each disc through which the sleeve 73 extends. The shaft 53 fits tightly in the sleeve 73 and a portion of the shaft has a serrated or upset section 76 which is forced into the sleeve and insures a firm and rigid assembly of these elements. The outer margin 77 of each disc 70 is turned outwardly toward and into an annular groove 78 that is formed on the end plate and in such manner as to insure the extremity of the disc being disposed in the groove, but without interfering with relative rotation between the disc and end plates.

Figure 3:
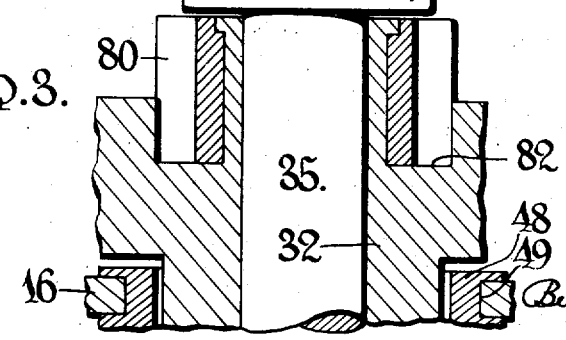
Fig. 3 is a longitudinal section, on a larger scale, and taken along the crank shaft of the fishing reel.
Figure 4:
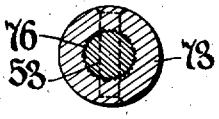
Fig. 4 is a cross section taken substantially along the line IV—IV of Fig. 1.

As best shown in Figs. 1 and 3, an annular gear 80 is rigidly secured axially of one end of the sleeve 32 in a recessed portion 82 thereof and in axial offset relation to the gear 33. It will be observed that the adjacent inner ends of the gear 80 and sleeve 32 are flush and are spaced slightly from the head 36 of the bearing stud 35. By manipulating the cap 37 the bearing elements 39 and 40 are brought together and both of these inner flush ends are prevented from bearing against the stud head 36. In turning the crank 30 the tendency is naturally to press inwardly, against the reel ends, thereby imposing pressure upon the thrust bearing elements 39 and 40. The sleeve 48 can be composed of such material as to provide at its inner end a suitable thrust bearing element for the sleeve 32 or gear 33 to counteract the tendency of the sleeve to move in an outward direction.

Figure 2:
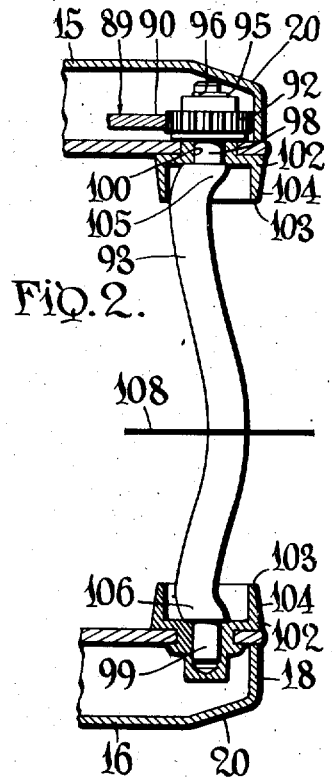
Fig. 2 is a fragmentary section illustrating the mounting of a level wind device in the end housings of a fishing reel.

The gear 80 meshes with a larger gear 85 which is carried rigidly upon one end of a shaft 86 reaching from one end plate 10 to the other end plate 12. A bearing sleeve 87 rigidly mounted in the end plate 12 supports the shaft 86 and the end portion of this shaft is rigidly mounted in an axial bearing extension 88 of the gear 85. Inside the casing 15, the shaft 86 has a driving connection arranged like the gear 85 for driving the level wind operating mechanism 89 (Fig. 2) in a manner clearly described in my patent referred to above.

It will be observed that the gearing members 85, 90 and 92 having their peripheries adjacent the peripheries of the discs 10 and 12 are also located closely adjacent the side surfaces of these discs. Thus the outer portions of the casings can be formed with the sloping or beveled sections 20 without interfering with the proper operation of the gearing and these beveled sections materially enhance the appearance of the reel.

The mechanism 89 is provided with an oscillatable gear segment 90 which engages a pinion 92 mounted rigidly upon the end of a level wind shaft 93 and a resilient split ring 95 is sprung into a groove 96 formed in the shaft to prevent the pinion 92 from being displaced from the end of the shaft. Opposite end bearing portions 98 and 99 of the level wind shaft are journalled in bearings 100 formed as parts of protective shells 102 which are rigidly secured in the end plates 10 and 12.

Annular flanges 103 integral with the shells 102 have their outer surfaces 104 beveled inwardly and converge toward each other. These flanges overlap the end portions of the shaft 93 adjacent its bearings 98 and 99.

The body of the spiral shaft 93 is composed of suitable material, such as wire, which is bent into the desired spiral form. Adjacent these bearing portions 98 and 99 the spiral shaft has offset sections 105 and 106 at which the spiraling of the shaft begins, and the spiral configuration extends slightly less than one complete circumferential turn while extending longitudinally substantially the distance between the bearing portions 98 and 99. The ratio between the gear segment 90 and the pinion 92 is such that the oscillation of the gear segment in either direction from its respective limits of oscillation causes slightly less than one complete revolution of the level wind shaft 93.

Since the spiral configuration of the shaft 93 traverses slightly less than one complete circumferential portion of the shaft, and the latter in each cycle of oscillation turns slightly less than one complete revolution, the fishing line 108 lying upon the spiral will be shifted laterally from side to side, or in other words, from end to end of the spool 53—73 in response to the oscillatory movement of the segment 90. The spiral surface of the shaft, which is substantially uniformly circular in cross section provides a cam like action upon the line in shifting it. The offset portions 105 and 106 at the end portions of the shaft automatically reverse the shifting action upon the line adjacent the ends of the shaft upon reversal of the rotative motion of the shaft in its oscillation.

It has been found, under certain conditions, in the absence of the flanges 103 that when the fishing line is played out rapidly, it would sometimes be momentarily delayed in assuming its proper position upon the guiding surfaces of the spiral shaft by falling upon the latter at a location immediately adjacent the bearing portions 98 and 99. In order to guard against such delayed action when the line happens to fall adjacent the shaft ends or after it has been whipped laterally by rapid movement thereof, the beveled flanges 103 are provided to prevent the line from reaching the outer extremities of the shaft portions 105 and 106. When the line falls upon either of the annular beveled surfaces 104 it is immediately guided inwardly to assure its proper position for level wind guiding upon the spiral shaft.

Although only illustrative structure involving invention has been shown and described in detail it is apparent to those skilled in the art that the invention is not so limited but that various changes may be made therein without departing from the scope of the appended claims.

I claim:

1. In a fishing reel having means for winding a fishing line thereon, a level wind shaft having guiding portions for shifting the fishing line alternately from end to end of the reel, means for driving the level wind shaft, and means overlapping a portion of the shaft for shifting the line into guided position upon the shaft adjacent an end thereof.

2. In a fishing reel having devices for winding a fishing line thereon, a level wind shaft formed with portions for guiding the fishing line alternately from end to end of the reel, mechanism for driving the level wind shaft, bearings in the reel for the shaft ends, and a member carried in the reel adjacent each end of the shaft and extending inwardly toward each other for shifting the line into guided position upon the shaft upon the falling of the line upon said member.

3. In a fishing reel having devices for winding a fishing line thereon, a level wind shaft formed with portions for guiding the fishing line alternately from end to end of the reel, mechanism for driving the level wind shaft, bearings in the reel structure for supporting the shaft ends, shielding means in the reel disposed adjacent the end bearings for the shaft in overlapping relation to the end portions of the shaft for shifting the line into guided position upon the shaft upon the falling of the line upon said means.

4. In a fishing reel having devices for winding a fishing line thereon, a level wind shaft formed with means for guiding the fishing line alternately from end to end of the reel, mechanism for driving the level wind shaft, bearings in the reel structure for supporting opposite end portions of the shaft, inwardly sloping shielding means in the reel disposed adjacent the bearings for spacing the line from the junction of the shaft and its bearings when the line falls toward said junction.

5. In a fishing reel having devices for winding a fishing line thereon, a level wind shaft formed with means for guiding the fishing line from end to end of the reel, mechanism for driving the level wind shaft, bearings in the reel structure for supporting the shaft ends, hoods in the reel structure adjacent the bearing supports of the shaft and having surfaces sloping toward each other and toward the axis of the shaft for shifting the line into guided position upon the shaft upon the falling of the line upon either of said hoods.

6. In a fishing reel having devices for winding a fishing line thereon, a level wind shaft formed with means for guiding the fishing line from end to end of the reel, casings at opposite ends of the reel, means in the casings for driving said devices and shaft, said shaft having bearings in said casings, hoods extending from the casings and overlapping end portions of the shaft for shifting the line into guided position upon the shaft upon the falling of the line upon said hoods.

7. In a fishing reel having devices for winding a fishing line thereon, a level wind shaft formed with means for guiding the fishing line from end to end of the reel, disc plates incorporated at opposite ends of the reel and rotatably supporting the shaft, said devices including a crank having a bearing sleeve connected thereto, said sleeve having driving connection with said shaft, a stud mounted in one of the disc plates and rotatably supporting the sleeve, and a jewel thrust bearing carried by the outer end of the sleeve and engaging the outer end of the stud for spacing the inner sleeve end out of thrust bearing relation to both the inner end of the stud and the stud supporting plate, the latter disc plate having thereon bearing means preventing outward displacement of the sleeve.

8. A fishing reel comprising opposed end plates, means for rigidly assembling said plates in spaced relation, a level wind device carried by the plates, a spool rotatable in the plates for receiving a fishing line, a bearing stud having a head portion rigidly mounted in one of the plates, a sleeve rotatable on said stud and carrying a crank for rotating it, said sleeve having driving connections with the level wind device and with the spool, and a jewel bearing member adjustable axially upon the outer end of the sleeve and bearing against the outer end of the stud and maintaining the inner end of the sleeve out of thrust bearing contact with other elements of the reel to protect the adjacent elements of the sleeve and stud mounting against wear, the latter disc plate having thereon means maintaining the sleeve against outward displacement from the stud.

9. In a fishing reel having end members, a line winding spool and level wind mechanism carried in the end members, a power transmitting sleeve having a crank rigid therewith, a gear rigidly carried on the inner end portion of the sleeve, a smaller gear rigidly carried on the inner end of the sleeve and extending axially beyond the first gear, one of the end members having a bearing stud rigid therewith and extending through the sleeve for rotatably supporting the latter, cooperating thrust bearing elements carried by the outer end portions of the sleeve and stud and spacing the smaller gear and its supporting end portion of the sleeve free from all thrust bearing relation whereby inward pressure incidental to operating the reel crank is absorbed by said thrust bearing elements, means carried by one of the end members to prevent outward axial displacement of the sleeve, and means for connecting said gears in driving relation to the winding spool and level wind mechanism.

10. In a fishing reel comprising devices for winding a fishing line thereon, said devices including a line winding spool shaft, end members incorporated at opposite end portions of the reel and rotatably supporting the shaft, a crank having a bearing sleeve connected thereto, said sleeve and shaft having gearing connecting them in driving relation, a stud mounted on one of the end members and rotatably supporting the sleeve, and a thrust bearing carried by the outer end of the sleeve and engaging the outer end of the stud for spacing the inner sleeve end free from thrust bearing relation to both the inner end portion of the stud and the stud supporting member, the latter end member having thereon bearing means preventing outward displacement of the sleeve from the stud.

11. A fishing reel comprising opposed end members, means rigidly securing said members in spaced assembled relation, a spool rotatably carried in said members for receiving a fishing line, a bearing stud having an end portion rigidly mounted in one of said end members, a sleeve rotatable on said stud and carrying a crank for rotating it, said sleeve having driving connections with the spool to rotate the latter, and a thrust bearing positioned axially upon the outer end portion of the sleeve and bearing against the outer end of the stud and maintaining the inner end of the sleeve out of thrust bearing contact with other elements of the reel to protect the adjacent elements of the sleeve and stud mounting against wear, the last mentioned end member having thereon bearing means maintaining the sleeve against outward displacement from the stud.

12. A fishing reel having a bearing stud, means for supporting the inner end portion of the bearing stud in the reel, a sleeve rotatable on said stud and carrying a crank at its outer end to facilitate manual operation thereof, a thrust bearing having means securing it to the sleeve axially of the latter and in thrust bearing contact with the outer end of the stud whereby the stud rotatably carries the sleeve, the inner end of the sleeve being free from thrust bearing engagement to protect adjacent reel structure and the sleeve end from wear.

13. In a fishing reel having a bearing stud, means for supporting the inner end portion of the bearing stud in the reel, a sleeve rotatable on said stud and carrying a crank at its outer end to facilitate manual operation thereof, and means demountably assembled axially on said sleeve and including a thrust bearing element abutting the outer end of the stud whereby the stud rotatably carries the sleeve, the inner end of the sleeve being free from thrust bearing engagement to protect adjacent reel structure about the inner sleeve end from wear.

HYLA F. MAYNES.